(12) United States Patent
Chae (10) Patent No.: US 12,347,197 B2
(45) Date of Patent: Jul. 1, 2025

(54) DEVICE AND METHOD FOR GENERATING SPEECH VIDEO ALONG WITH LANDMARK

(71) Applicant: DEEPBRAIN AI INC., Seoul (KR)

(72) Inventor: Gyeongsu Chae, Seoul (KR)

(73) Assignee: DEEPBRAIN AI INC., Seoul (KR)

(*) Notice: Subject to any disclaimer, the term of this patent is extended or adjusted under 35 U.S.C. 154(b) by 418 days.

(21) Appl. No.: 17/762,926

(22) PCT Filed: Dec. 15, 2020

(86) PCT No.: PCT/KR2020/018372
§ 371 (c)(1),
(2) Date: Mar. 23, 2022

(87) PCT Pub. No.: WO2022/045485
PCT Pub. Date: Mar. 3, 2022

(65) Prior Publication Data
US 2022/0375224 A1 Nov. 24, 2022

(30) Foreign Application Priority Data
Aug. 28, 2020 (KR) .................. 10-2020-0109173

(51) Int. Cl.
*G06V 20/40* (2022.01)
*G06V 10/82* (2022.01)
(Continued)

(52) U.S. Cl.
CPC .............. *G06V 20/46* (2022.01); *G06V 10/82* (2022.01); *G06V 40/171* (2022.01); *G10L 15/02* (2013.01); *G10L 25/30* (2013.01); *G10L 25/57* (2013.01)

(58) Field of Classification Search
CPC ...... G06V 20/46; G06V 40/171; G06V 10/82; G10L 15/02; G10L 25/30; G10L 25/57
See application file for complete search history.

(56) References Cited

U.S. PATENT DOCUMENTS 10,972,682 B1 * 4/2021 Muenster ............. G11B 27/034
2004/0235531 A1 * 11/2004 Anzawa ............ H04M 1/72427
455/563
(Continued)

FOREIGN PATENT DOCUMENTS

KR  10-2006-0090687 A  8/2006
KR  10-2014-0037410 A  3/2014
KR  10-2020-0043660 A  4/2020

OTHER PUBLICATIONS

International Search Report for PCT/KR2020/018372 mailed on May 24, 2021.
(Continued)

*Primary Examiner* — Mishawn N. Hunter
(74) *Attorney, Agent, or Firm* — The PL Law Group, PLLC (57) ABSTRACT

A speech video generation device according to an embodiment includes a first encoder, which receives an input of a person background image that is a video part in a speech video of a predetermined person, and extracts an image feature vector from the person background image, a second encoder, which receives an input of a speech audio signal that is an audio part in the speech video, and extracts a voice feature vector from the speech audio signal, a combining unit, which generates a combined vector by combining the image feature vector output from the first encoder and the voice feature vector output from the second encoder, a first decoder, which reconstructs the speech video of the person using the combined vector as an input, and a second decoder, which predicts a landmark of the speech video using the combined vector as an input.

9 Claims, 7 Drawing Sheets

(51) Int. Cl.
  *G06V 40/16* (2022.01)
  *G10L 15/02* (2006.01)
  *G10L 25/30* (2013.01)
  *G10L 25/57* (2013.01)

(56) References Cited

U.S. PATENT DOCUMENTS

| | | | |
|---|---|---|---|
| 2018/0174348 A1 | 6/2018 | Bhat et al. | |
| 2021/0027511 A1* | 1/2021 | Shang | G06N 3/044 |
| 2021/0056348 A1* | 2/2021 | Berlin | G06T 11/60 |
| 2021/0248801 A1* | 8/2021 | Li | G06T 13/205 |

OTHER PUBLICATIONS

Konstantinos Vougioukas et al. "Realistic Speech-Driven Facial Animation with GANs", arXiv:1906.06337. 2019 [Retreived on Apr. 27, 2021]. Retrieved form <URL: https://arxiv.org/abs/1906.06337>.

Sinha, Sanjana et al. "Identity-Preserving Realistic Talking Face Generation", arXiv:2005.12318. 2020 [Retrieved on Apr. 27, 2021]. Retrieved form <URL: https;//arxiv.org/abs/2005.12318>.

Office action issued on Jan. 12, 2022 from Korean Patent Office in a counterpart Korean Patent Application No. 10-2020-0109173 (all the cited references are listed in this IDS.) (English translation is also submitted herewith.).

Office action issued on Jul. 27, 2022 from Korean Patent Office in a counterpart Korean Patent Application No. 10-2020-0109173 (all the cited references are listed in this IDS.) (English translation is also submitted herewith.).

Lezi Wang et al, "A coupled encoder decoder network for joint face detection and landmark localization", Image and Vision Computing 87, 2019, pp. 37-46.

Hao Zhu et al., "Arbitrary talking face generation via attentional audio-visual coherence learning", 2020, arXiv: 1812.06589v2, [cs.CV].

Linsen Song et al., "Geometry Aware Face Completion and Editing", Association for the Advancement of Artificial Intelligence, Feb. 2019, pp. 2506-2513.

Lele Chen et al., "Hierarchical Cross-Modal Talking Face Generation with Dynamic Pixel-Wise Loss", the Procs. of the IEEE / CVF Conference on CVPR, 2019, pp. 7832-7841.

Alexandros Koumparoulis et al., "Audio-Assisted Image Inpainting for Talking Faces", Icassp 2020, Apr. 2020, pp. 7664-7668.

* cited by examiner

DEVICE AND METHOD FOR GENERATING SPEECH VIDEO ALONG WITH LANDMARK

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2020/018372, filed Dec. 15, 2020, which claims priority to the benefit of Korean Patent Application No. 10-2020-0109173 filed in the Korean Intellectual Property Office on Aug. 28, 2020, the entire contents of which are incorporated herein by reference.

BACKGROUND

1. Technical Field

Embodiments of the present disclosure relate to a speech video generation technology.

2. Background Art

Nowadays, with the development of the artificial intelligence technology field, various types of content are generated based on an artificial intelligence technology. For example, when there is a voice message to be delivered, it may be desirable to generate a speech video in which the voice message sounds as if it is uttered by a famous person (e.g., president or the like) so as to attract the attention of people. This is implemented by generating lip shapes or the like suitable for a specific message so that the lip shapes look as if a famous person utters the specific message in a video of the famous person.

Conventionally, in order to synthesize such a lip sync face image, a method is used, in which a face landmark is extracted from an input image and is compared with a correct value, and learning is performed so as to minimize a difference therebetween. However, since there is annotation noise in a correct value of face landmark data in an image, continuity over time is unstable, thus causing deterioration of image quality of a lip sync face image synthesized based on the correct value of the face landmark data in an image.

That is, the correct value of the face landmark data in an image is obtained by a person by labeling while viewing the image, and each person may have a different criterion when multiple persons work on this operation, and even if the same person works, corresponding points cannot be marked for each image frame, and thus the presence of the annotation noise is unavoidable. Conventionally, as described above, a face landmark is predicted using a correct value having noise, and when a face image is synthesized using the predicted face landmark, deterioration of image quality, such as image shaking, occurs.

Furthermore, conventionally, a learning model is used, which aligns a face landmark extracted from a speech image in a standard space, and predicts a face landmark by using a voice as an input. However, since a landmark is aligned in an inaccurate manner (e.g., based on an inaccurate estimated value, or simplifying conversion since three-dimensional movement or rotation is impossible in the case of two dimension), information loss and distortion occur, and thus lip shapes are not correctly synchronized, and unnecessary shaking or the like occurs.

Furthermore, since a reference point is located at a virtual position (e.g., an average position of entire face landmarks or an average position of lip part landmarks), it is difficult to control so as to move only a speaking part while the head of a corresponding person is fixed.

SUMMARY

Disclosed embodiments provide techniques for generating a speech video along with a landmark of the speech video.

A speech video generation device according to an embodiment is a computing device having one or more processors and a memory which stores one or more programs executed by the one or more processors, the speech video generation device including: a first encoder, which receives an input of a person background image that is a video part in a speech video of a predetermined person, and extracts an image feature vector from the person background image; a second encoder, which receives an input of a speech audio signal that is an audio part in the speech video, and extracts a voice feature vector from the speech audio signal; a combining unit, which generates a combined vector by combining the image feature vector output from the first encoder and the voice feature vector output from the second encoder; a first decoder, which reconstructs the speech video of the person using the combined vector as an input; and a second decoder, which predicts a landmark of the speech video using the combined vector as an input.

A portion related to a speech of the person may be hidden by a mask in the person background image.

The speech audio signal may be an audio part of the same section as the person background image in the speech video of the person.

The first decoder may be a machine learning model trained to reconstruct the portion hidden by the mask in the person background image based on the voice feature vector.

When the person background image of the predetermined person is input to the first encoder, and the speech audio signal not related to the person background image is input to the second encoder, the combining unit may generates the combined vector by combining the image feature vector output from the first encoder and the voice feature vector output from the second encoder, the first decoder may receive the combined vector to generate the speech video of the person by reconstructing, based on the speech audio signal not related to the person background image, the portion related to the speech in the person background image, and the second decoder may predict and output the landmark of the speech video.

The second decoder may include: an extraction module trained to extract a feature vector from the input combined vector; and a prediction module trained to predict landmark coordinates of the speech video based on the feature vector extracted by the extraction module.

An objective function $L_{prediction}$ of the second decoder may be expressed as an equation below.

$$L_{prediction} = \|K - G(I; \theta)\| \quad \text{(Equation)}$$

K: Labeled landmark coordinates of a speech video
G: Neural network constituting the second decoder
$\theta$: Parameter of the neural network constituting the second decoder
I: Combined vector
$G(I; \theta)$: Landmark coordinates predicted by the second decoder
$\|K - G(I; \theta)\|$: Function for deriving a difference between the labeled landmark coordinates and the predicted landmark coordinates of the speech video The second decoder may include: an extraction module trained to extract a feature tensor from the input combined vector; and a prediction module trained to predict a landmark image based on the feature tensor extracted by the extraction module.

The landmark image may be an image indicating, by a probability value, whether each pixel corresponds to a landmark in an image space corresponding to the speech video.

An objective function $L_{prediction}$ of the second decoder may be expressed as an equation below.

$$L_{prediction} = -\Sigma\{p_{target}(x_i, y_i)\log(p(x_i, y_i)) + (1 - p_{target}(x_i, y_i))\log(1 - p(x_i, y_i))\}$$ (Equation)

$p(x_i, y_i)$: Probability value pertaining to whether a pixel $(x_i, y_i)$ is a landmark where $p(x_i, y_i)$=probability distribution$(P(F(x_i, y_i); \delta))$ P: Neural network constituting the second decoder $F(x_i, y_i)$: Feature tensor of the pixel $(x_i, y_i)$ $\delta$: Parameter of the neural network constituting the second decoder $p_{target}(x_i, y_i)$: Labeled landmark indication value of the pixel $(x_i, y_i)$ of a speech video A speech video generation device according to another embodiment is a computing device having one or more processors and a memory which stores one or more programs executed by the one or more processors, the speech video generation device including: a first encoder, which receives an input of a person background image that is a video part in a speech video of a predetermined person, and extracts an image feature vector from the person background image; a second encoder, which receives an input of a speech audio signal that is an audio part in the speech video, and extracts a voice feature vector from the speech audio signal; a combining unit, which generates a combined vector by combining the image feature vector output from the first encoder and the voice feature vector output from the second encoder; a decoder, which uses the combined vector as an input, and performs deconvolution and up-sampling on the combined vector; a first output layer, which is connected to the decoder and outputs a reconstructed speech video of the person based on up-sampled data; and a second output layer, which is connected to the decoder and outputs a predicted landmark of the speech video based on the up-sampled data.

A speech video generation method according to an embodiment performed by a computing device having one or more processors and a memory which stores one or more programs executed by the one or more processors includes: receiving an input of a person background image that is a video part in a speech video of a predetermined person, and extracting an image feature vector from the person background image; receiving an input of a speech audio signal that is an audio part in the speech video, and extracting a voice feature vector from the speech audio signal; generating a combined vector by combining the image feature vector output from the first encoder and the voice feature vector output from the second encoder; reconstructing the speech video of the person using the combined vector as an input; and predicting a landmark of the speech video using the combined vector as an input.

According to the embodiment disclosed herein, the image feature vector is extracted from the person background image, the voice feature vector is extracted from the speech audio signal, the combined vector is generated by combining the image feature vector and the voice feature vector, and then a speech video and a landmark are predicted together based on the combined vector, and thus the speech video and the landmark may be more accurately predicted. Here, the reconstructed (predicted) speech video is learnt so as to minimize a difference with the original speech video, and the predicted landmark is learnt so as to minimize a difference with the labeled landmark extracted from the original speech video.

Here, since a learning for simultaneously predicting an actual speech video and a landmark is performed in a state in which a face position of a corresponding person and a landmark position spatially match, a shape change due to an overall face motion and a shape change of a speaking part due to a speech may be separately learnt without preprocessing for aligning the landmark in a standard space.

Furthermore, since a neural network for reconstructing a speech video and a neural network for predicting a landmark are integrated into one component, a pattern about a motion of a speech-related portion may be shared and learnt, and thus noise may be efficiently eliminated from a predicted landmark.

DETAILED DESCRIPTION

Hereinafter, specific embodiments of the present disclosure will be described with reference to the accompanying drawings. The following detailed description is provided to assist in a comprehensive understanding of the methods, devices and/or systems described herein. However, the detailed description is only illustrative, and the present disclosure is not limited thereto.

In describing embodiments of the present disclosure, when a specific description of known technology related to the present disclosure is deemed to make the gist of the present disclosure unnecessarily vague, the detailed description thereof will be omitted. The terms used below are defined in consideration of functions in the present disclosure, but may vary in accordance with the customary practice or the intention of a user or an operator. Therefore, the terms should be defined based on whole content throughout the present specification. The terms used herein are only for describing the embodiments of the present disclosure, and should not be construed as limitative. A singular expression includes a plural meaning unless clearly used otherwise. In the present description, expressions such as "include" or "have" are for referring to certain characteristics, numbers, steps, operations, components, some or combinations thereof, and should not be construed as excluding the presence or possibility of one or more other characteristics, numbers, steps, operations, components, some or combinations thereof besides those described.

In the following description, the terms "transmission", "communication", and "reception" of a signal or information and other similar terms may include a meaning in which the signal or information is directly transmitted from one element to another element and transmitted from one element to another element through an intervening element. In particular, "transmission" or "sending" of the signal or information to one element may indicate a final destination of the signal or information and may not imply a direct destination. The same applies to "reception" of the signal or information. In addition, in the present specification, a meaning in which two or more pieces of data or information are "related" indicates that when any one piece of data (or information) is obtained, at least a portion of other data (or information) may be obtained based thereon.

Directional terms such as "upper side", "lower side", "one side", and "other side" are used in relation to the orientations in the disclosed drawings. Since components of the embodiments of the present disclosure may be positioned in various orientations, the directional terms are merely illustrative and do not limit the components.

Furthermore, the terms "first", "second" and the like may be used for describing various elements, but the elements should not be construed as being limited by the terms. These terms may be used for distinguishing one element from another element. For example, a first element could be termed a second element and vice versa without departing from the scope of the present disclosure.

Figure 1:
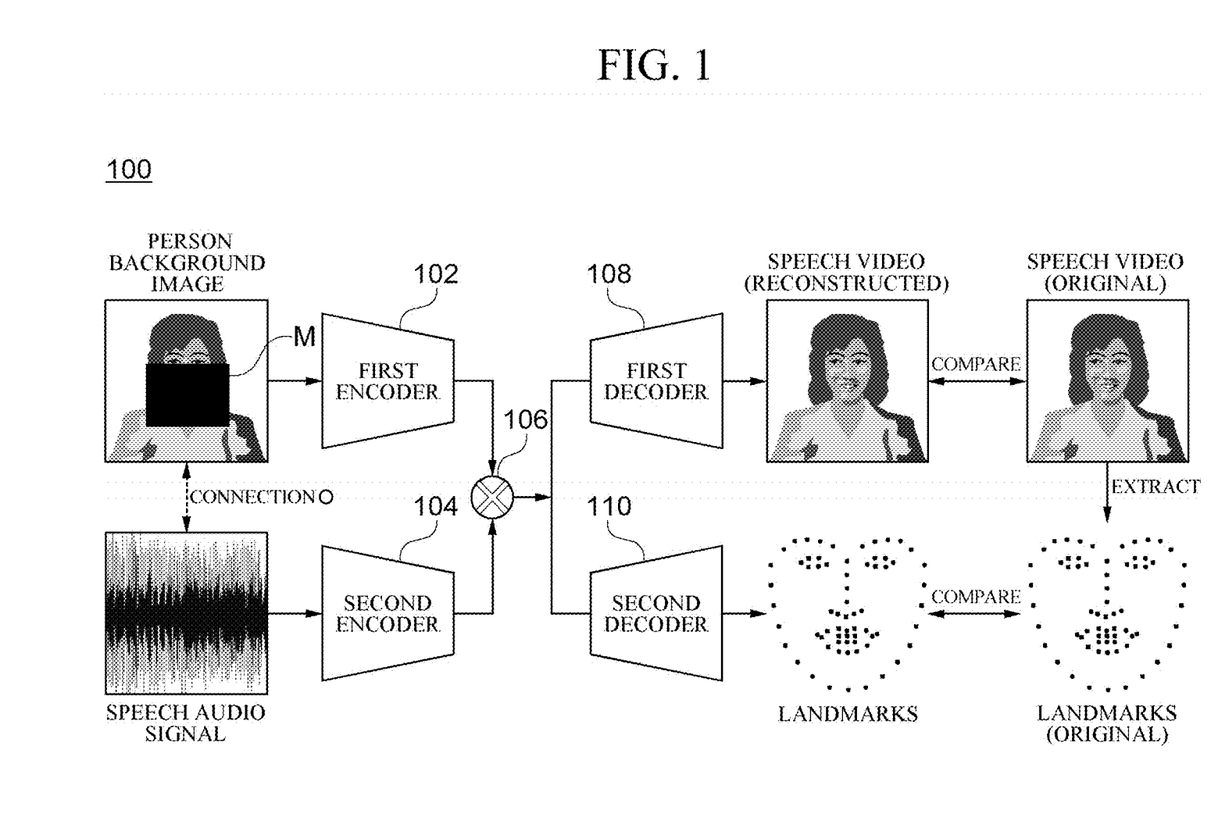
FIG. 1 is a diagram illustrating a configuration of a device for generating a speech video along with a landmark according to an embodiment of the present disclosure.

FIG. 1 is a diagram illustrating a configuration of a device for generating a speech video along with a landmark according to an embodiment of the present disclosure.

Referring to FIG. 1, a speech video generation device 100 may include a first encoder 102, a second encoder 104, a combining unit 106, a first decoder 108, and a second decoder 110.

The configuration of the speech video generation device 100 illustrated in FIG. 1 shows functional elements that are functionally differentiated, wherein the functional elements may be functionally connected to each other to perform functions according to the present disclosure, and one or more elements may be actually physically integrated.

In an example embodiment, the speech video generation device 100 may be implemented with a convolutional neural network (CNN)-based machine learning technology, but is not limited thereto, and other various machine learning technologies may be applied. The following description is provided with a focus on a learning process for generating a speech video along with a landmark.

The first encoder 102 may be a machine learning model trained to extract an image feature vector using a person background image as an input. Hereinafter, the term "vector" may also be used to refer to a "tensor".

Here, the person background image input to the first encoder 102 is an image in which a person utters (speaks). In an example embodiment, the person background image may be an image including a face and upper body of a person. That is, the person background image may be an image including not only a face but also an upper body so as to show motions of the face, neck, and shoulder of the person when the person utters, but is not limited thereto.

A portion related to a speech in the person background image input to the first encoder 102 may be masked. That is, a portion (e.g., a mouth and a portion around the mouth) related to a speech in the person background image may be hidden by a mask M. Furthermore, during a masking process, portions related to a face motion, neck motion, and shoulder motion due to a person's speech may not be masked in the person background image. In this case, the first encoder 102 extracts an image feature vector of a portion excluding the portion related to a speech in the person background image.

In an example embodiment, the first encoder 102 may include at least one convolutional layer and at least one pooling layer. The convolutional layer, while moving a filter of a preset size (e.g., 3×3 pixel size) at a fixed interval in the input person background image, may extract a feature value of pixels corresponding to the filter. The pooling layer may receive an output from the convolutional layer as an input and may perform down sampling thereon.

The second encoder 104 may be a machine learning model trained to extract a voice feature vector using a speech audio signal as an input. Here, the speech audio signal corresponds to an audio part in the person background image (i.e., an image in which a person utters) input to the first encoder 102. In other words, a video part in a video in which a person utters may be input to the first encoder 102, and an audio part may be input to the second encoder 104. In an example embodiment, the second encoder 104 may include at least one convolutional layer and at least one pooling layer, but a neural network structure of the second encoder 104 is not limited thereto.

The person background image input to the first encoder 102 and the speech audio signal input to the second encoder 104 may be synchronized in time. That is, in a section of the same time band in a video in which a person utters, a video may be input to the first encoder 102, and an audio may be input to the second encoder 104. Here, the person background image and the speech audio signal may be input to the first encoder 102 and the second encoder 104 every preset unit time (e.g., one frame or a plurality of successive frames).

The combining unit 106 may generate a combined vector by combining an image feature vector output from the first encoder 102 and a voice feature vector output from the second encoder 104. In an example embodiment, the combining unit 106 may generate the combined vector by concatenating the image feature vector and the voice feature vector, but the present disclosure is not limited thereto, and the combining unit 106 may generate the combined vector by combining the image feature vector and the voice feature vector in other various manners.

The first decoder 108 may be a machine learning model trained to reconstruct a speech video of a person using the combined vector output from the combining unit 106 as an input. In detail, the first decoder 108 may be a machine learning model trained to reconstruct a portion (i.e., a portion related to a speech) hidden by the mask M of the image feature vector (i.e., a feature of a video part, in which the speech-related portion is hidden by the mask, in a video in which a person utters) output from the first encoder 102, based on the voice feature vector (i.e., a feature of an audio part in the video in which a person utters) output from the second encoder 104. That is, the first decoder 108 may be a model trained to reconstruct a masked region using an audio signal, when a portion related to a speech is masked in the person background image.

In an example embodiment, the first decoder 108 may generate a speech video by performing up sampling after performing deconvolution on the combined vector obtained by combining the image feature vector output from the first encoder 102 and the voice feature vector output from the second encoder 104.

The first decoder 108 may compare a reconstructed speech video with an original speech video (i.e., a correct value), and may adjust a learning parameter (e.g., a loss function, a softmax function, etc.) so that the reconstructed speech video (i.e., a video in which a speech-related portion has been reconstructed through an audio part) approximates to the original speech video.

The second decoder 110 may be a machine learning model trained to predict a landmark of a speech video using the combined vector output from the combining unit 106 as an input. The second decoder 110 may extract a feature vector (or feature tensor) from the combined vector, and may predict a landmark of a speech video based on the extracted feature vector (or feature tensor).

The second decoder 110 may compare the predicted landmark with a labeled landmark (landmark extracted from an original speech video), and may adjust a learning parameter (e.g., a loss function, a softmax function, etc.) so that the predicted landmark approximates to the labeled landmark.

According to the embodiment disclosed herein, the image feature vector is extracted from the person background image, the voice feature vector is extracted from the speech audio signal, the combined vector is generated by combining the image feature vector and the voice feature vector, and then a speech video and a landmark are predicted together based on the combined vector, and thus the speech video and the landmark may be more accurately predicted. Here, the reconstructed (predicted) speech video is learnt so as to minimize a difference with the original speech video, and the predicted landmark is learnt so as to minimize a difference with the labeled landmark extracted from the original speech video.

Here, since a learning for simultaneously predicting an actual speech video and a landmark is performed in a state in which a face position of a corresponding person and a landmark position spatially match, a shape change due to an overall face motion and a shape change of a speaking part due to a speech may be separately learnt without preprocessing for aligning the landmark in a standard space.

Furthermore, since a neural network for reconstructing a speech video and a neural network for predicting a landmark are integrated into one component, a pattern about a motion of a speech-related portion may be shared and learnt, and thus noise may be efficiently eliminated from a predicted landmark.

Figure 2:
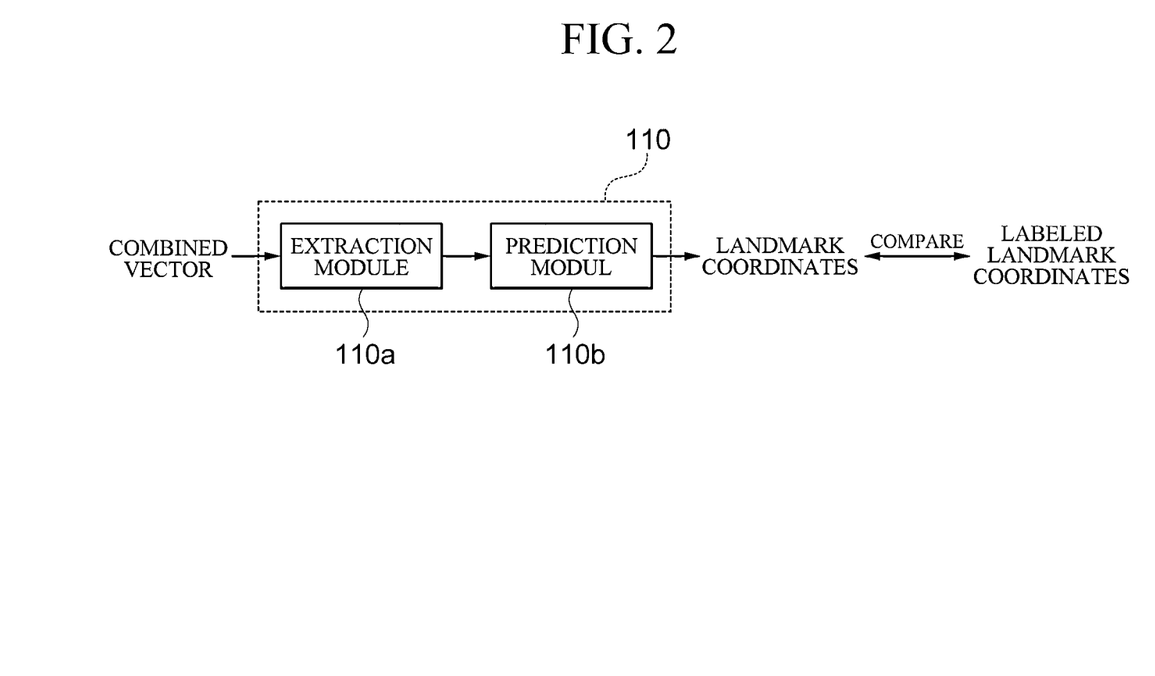
FIG. 2 is a diagram illustrating an example of predicting a landmark in a speech video generation device according to an embodiment of the present disclosure.

FIG. 2 is a diagram illustrating an example of predicting a landmark in a speech video generation device according to an embodiment of the present disclosure.

Referring to FIG. 2, the second decoder 110 may include an extraction module 110a and a prediction module 110b.

The extraction module 110a may be trained to extract a feature vector from an input combined vector. The extraction module 110a may extract the feature vector from the combined vector through a plurality of convolutional neural network layers.

The prediction module 110b may be trained to predict landmark coordinates of a speech video based on the feature vector extracted by the extraction module 110a. That is, the prediction module 110b may be trained to predict a coordinate value corresponding to a landmark in a coordinate system of a speech video based on the extracted feature vector. Here, landmark coordinates may be two-dimensionally or three-dimensionally expressed. When landmark coordinates are three dimensional, landmark coordinates K may be expressed as Equation 1 below.

$$K=[(x_1,y_1,z_1),(x_2,y_2,z_2),\ldots,(x_n,y_n,z_n)] \quad \text{(Equation 1)}$$

$x_n$: x-axis coordinate value of nth landmark
$y_n$: y-axis coordinate value of nth landmark
$z_n$: z-axis coordinate value of nth landmark Predicting landmark coordinates from the combined vector in the second decoder 110 may be expressed as Equation 2 below.

$$K'=G(I;\theta) \quad \text{(Equation 2)}$$

Here, K' denotes landmark coordinates predicted by the second decoder 110, G denotes a neural network constituting the second decoder 110, I denotes a combined vector, and $\theta$ denotes a parameter of the neural network G.

Furthermore, the second decoder 110 may be trained so as to minimize a difference between landmark coordinates predicted from the combined vector and labeled landmark coordinates. Here, an objective function $L_{prediction}$ of the second decoder 110 may be expressed as Equation 3 below.

$$L_{prediction}=\|K-G(I;\theta)\| \quad \text{(Equation 3)}$$

K denotes labeled landmark coordinates, and $\|A-B\|$ function denotes a function for deriving a difference between A and B (e.g., Euclidean distance L2 distance or Manhattan distance L1 distance between A and B).

Figure 3:
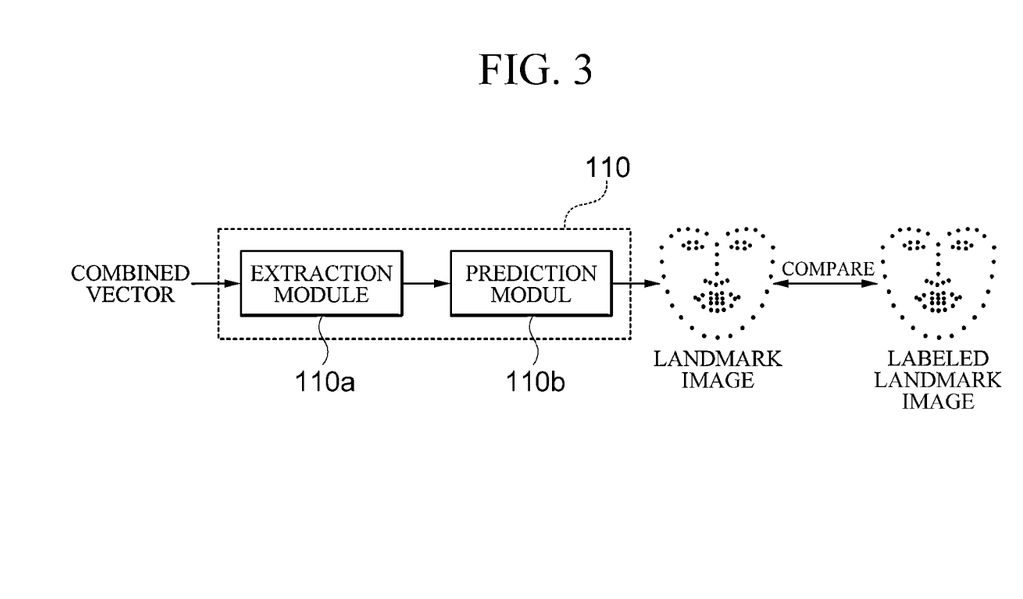
FIG. 3 is a diagram illustrating another example of predicting a landmark in a speech video generation device according to an embodiment of the present disclosure.

FIG. 3 is a diagram illustrating another example of predicting a landmark in a speech video generation device according to an embodiment of the present disclosure.

Referring to FIG. 3, the second decoder 110 may include the extraction module 110a and the prediction module 110b.

The extraction module 110a may be trained to extract a feature tensor from a combined vector. The extraction module 110a may extract a feature tensor so that a landmark is expressed as one point in an image space corresponding to a speech video.

The prediction module 110b may be trained to predict a landmark image based on the feature tensor extracted by the extraction module 110a. Here, the landmark image, which indicates whether each pixel corresponds to a landmark in the image space corresponding to the speech video, may be an image in which a pixel value of a pixel is set to 1 if the pixel corresponds to a landmark or set to 0 if the pixel does not correspond to a landmark.

In an example embodiment, the prediction module 110b may predict a landmark image by outputting a probability value (i.e., probability value pertaining to presence/absence of a landmark) between 0 and 1 for each pixel based on the extracted feature tensor. Outputting the probability value for each pixel from the prediction module 110b may be expressed as Equation 4 below.

$$p(x_i,y_i)=\text{probability distribution}(P(F(x_i,y_i);\delta)) \quad \text{(Equation 4)}$$

Here, $p(x_i, y_i)$ denotes a probability value indicating whether a pixel $(x_i, y_i)$ is a landmark, P denotes a neural network constituting the second decoder 110, $F(x_i, y_i)$ denotes a feature tensor of a pixel $(x_i, y_i)$, and $\delta$ denotes a parameter of a neural network P. Furthermore, a sigmoid, Gaussian, or the like may be used as a probability distribution function, but the probability distribution function is not limited thereto.

Meanwhile, the objective function $L_{prediction}$ of the second decoder 110 may be expressed as Equation 5 below.

$$L_{prediction} = -\Sigma\{p_{target}(x_i,y_i)\log(p(x_i,y_i)) + (1-p_{target}(x_i,y_i))\log(1-p(x_i,y_i))\}$$ (Equation 5)

Here, $p_{target}(x_i, y_i)$ denotes a labeled landmark indication value of a pixel $(x_i, y_i)$ of a speech video. That is, this parameter may be labeled to have a value of 1 when the corresponding pixel is a landmark and have a value of 0 when the corresponding pixel is not a landmark.

According to Equation 5, learning is performed so that the probability value (i.e., $p(x_i, y_i)$ indicating whether a pixel $(x_i, y_i)$ is a landmark increases when the labeled landmark indication value of the pixel $(x_i, y_i)$ is 1, and the probability value (i.e., $p(x_i, y_i)$ indicating whether a pixel $(x_i, y_i)$ is a landmark decreases when the labeled landmark indication value of the pixel $(x_i, y_i)$ is 0.

Meanwhile, the term "module" used herein may represent a functional or structural combination of hardware for implementing the technical concept of the present disclosure and software for driving the hardware. For example, the term "module" may represent predetermined codes and logical units of hardware resources for executing the predetermined codes, but does not necessarily represent physically connected codes or one type of hardware.

Figure 4:
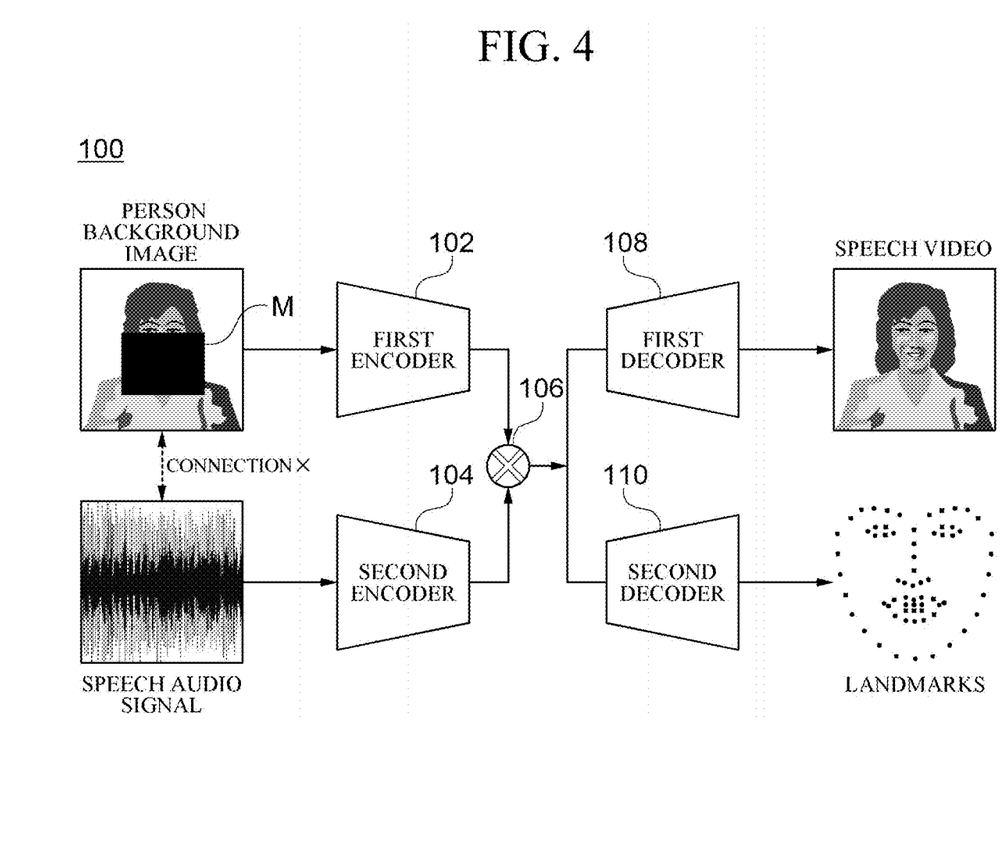
FIG. 4 is a diagram illustrating a state in which a speech video and a landmark are inferred through a speech video generation device according to an embodiment of the present disclosure.

FIG. 4 is a diagram illustrating a state in which a speech video and a landmark are inferred through a speech video generation device according to an embodiment of the present disclosure.

Referring to FIG. 4, the first encoder 102 receives a person background image. Here, the person background image may be one used in a learning process. The person background image may be an image including a face and upper body of a person. Furthermore, in the person background image, a portion related to a speech may be hidden by the mask M. The first encoder 102 may extract an image feature vector from the person background image.

The second encoder 104 receives an input of a speech audio signal. Here, the speech audio signal may not be related to the person background image input to the first encoder 102. For example, the speech audio signal may be a speech audio signal of a person different from the person in the person background image. However, the speech audio signal is not limited thereto, and may be one uttered by the person in the person background image. Here, the speech of the person may be one uttered in a situation or background not related to the person background image. The second encoder 104 may extract a voice feature vector from the speech audio signal.

The combining unit 106 may generate a combined vector by combining the image feature vector output from the first encoder 102 and the voice feature vector output from the second encoder 104.

The first decoder 108 may reconstruct and output a speech video using the combined vector as an input. That is, the first decoder 108 may generate the speech video by reconstructing a speech-related portion of the person background image based on the voice feature vector output from the second encoder 104. In this case, although the speech audio signal input to the second encoder 104 is a speech not related to the person background image (e.g., although the speech audio signal was not uttered by the person in the person background image), the speech video is generated as if the person in the person background image utters.

The second decoder 110 may predict and output a landmark of the speech video using the combined vector as an input. Here, since the speech video generation device 100 is trained to also predict a landmark of a speech video while reconstructing the speech video through the first decoder 108 and the second decoder 110 when the combined vector is input, the speech video generation device 100 may accurately and smoothly predict without a process of aligning the landmark of the speech video in a standard space.

Figure 5:
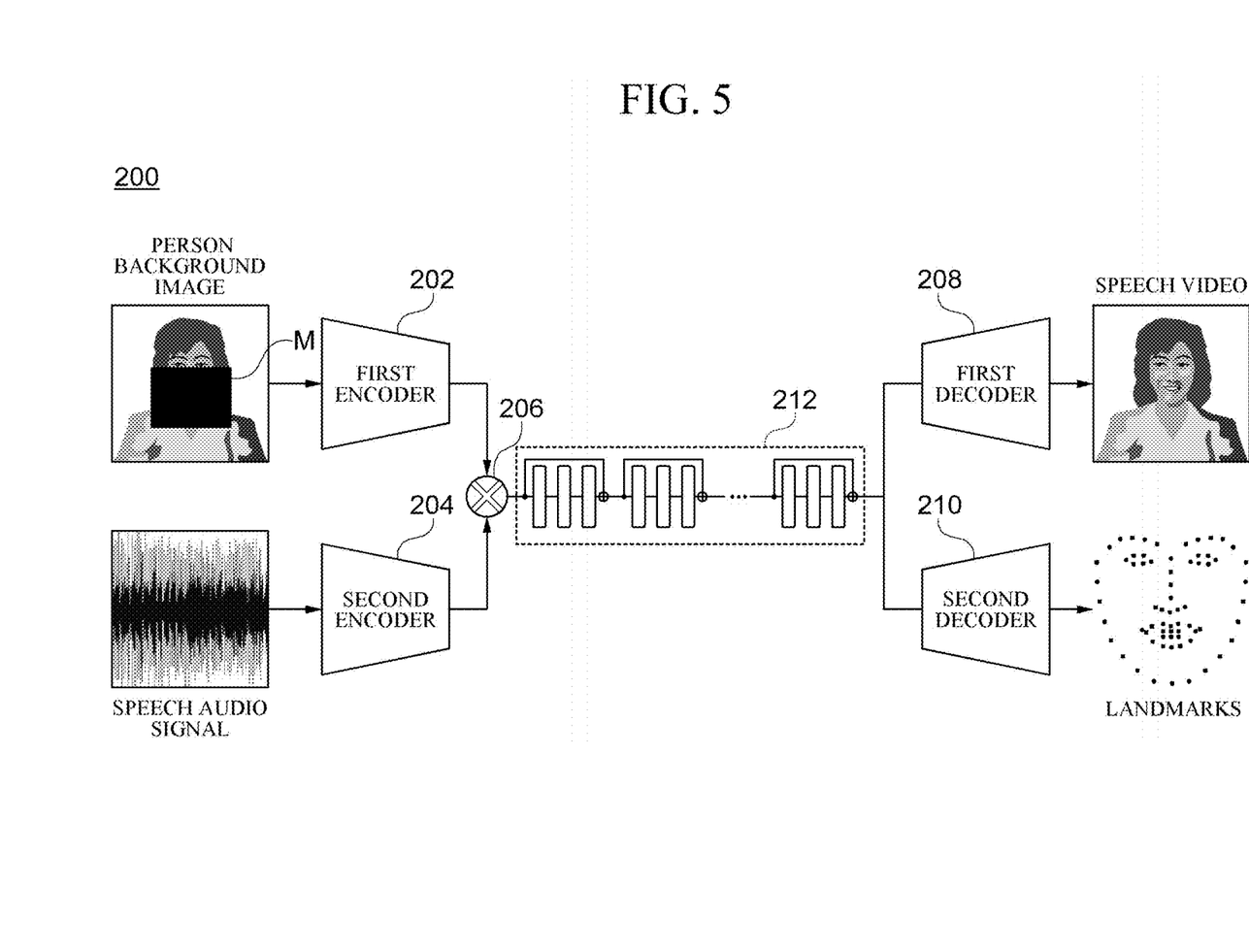
FIG. 5 is a diagram illustrating a configuration of a speech video generation device according to another embodiment of the present disclosure.

FIG. 5 is a diagram illustrating a configuration of a speech video generation device according to another embodiment of the present disclosure. Hereinafter, differences with the embodiment illustrated in FIG. 1 will be mainly described.

Referring to FIG. 5, a speech video generation device 200 may further include a residual block 212. At least one of the residual block 212 may be provided between a combining unit 206 and a first decoder 208 and second decoder 210. In an example embodiment, a plurality of the residual blocks 212 may be sequentially connected (in series) between the combining unit 206 and the first decoder 208 and second decoder 210.

The residual block 212 may include at least one convolutional layer. The residual block 212 may have a structure for performing convolution on an input value (i.e., combined vector output from the combining unit 206) and adding the input value to a result value of the convolution. The residual block 212 may learn minimization between an input value and output value of the residual block 212. In this manner, the image feature vector and the voice feature vector may be organically combined and used as an input for the first decoder 208 and the second decoder 210.

Figure 6:
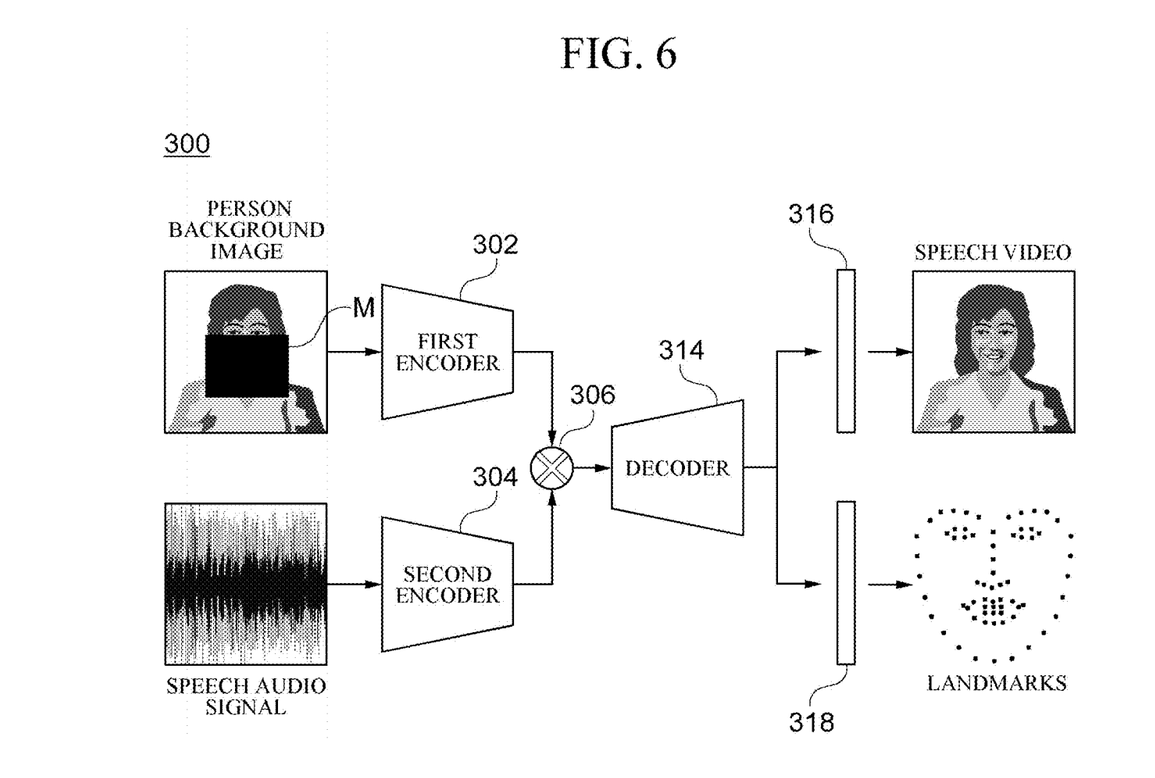
FIG. 6 is a diagram illustrating a configuration of a speech video generation device according to another embodiment of the present disclosure.

FIG. 6 is a diagram illustrating a configuration of a speech video generation device according to another embodiment of the present disclosure. Hereinafter, differences with the embodiment illustrated in FIG. 1 will be mainly described.

Referring to FIG. 6, a speech video generation device 300 may include a first encoder 302, a second encoder 304, a combining unit 306, a decoder 314, a first output layer 316, and a second output layer 318. Here, the first encoder 302, the second encoder 304, and the combining unit 306 are the same as or similar to those illustrated in FIG. 1, and are thus not described in detail below.

The decoder 314 may use a combined vector output from the combining unit 306 as an input, and may perform up sampling after performing deconvolution on the combined vector.

The first output layer 316, which is one output layer connected to the decoder 314, may output a reconstructed speech video based on data up-sampled by the decoder 314.

The second output layer 318, which is another output layer connected to the decoder 314, may output a predicted landmark of the speech video based on the data up-sampled by the decoder 314.

As described above, a process of deconvoluting and up-sampling the combined vector may be shared through the decoder 314, and only output layers may be differently configured so as to respectively output a reconstructed speech video and a predicted landmark.

Figure 7:
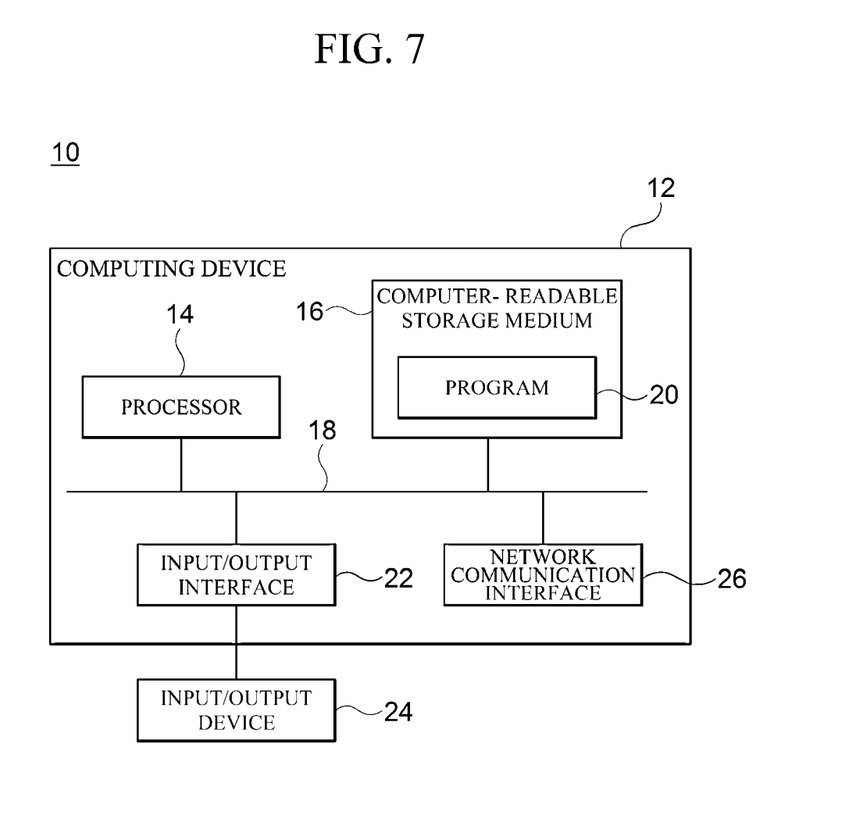
FIG. 7 is a block diagram illustrating a computing environment that includes a computing device suitable for use in example embodiments.

FIG. 7 is a block diagram illustrating a computing environment 10 that includes a computing device suitable for use in example embodiments. In the illustrated embodiment, each component may have different functions and capabilities in addition to those described below, and additional components may be included in addition to those described below.

The illustrated computing environment 10 includes a computing device 12. In an embodiment, the computing device 12 may be the speech video generation device 100.

The computing device 12 includes at least one processor 14, a computer-readable storage medium 16, and a communication bus 18. The processor 14 may cause the computing device 12 to operate according to the above-described example embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the example embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random access memory, a non-volatile memory, or any suitable combination thereof), one or more magnetic disk storage devices, optical disk storage devices, flash memory devices, other types of storage media that are accessible by the computing device 12 and store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The example input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, a speaker, and/or a network card. The example input/output device 24 may be included inside the computing device 12 as a component constituting the computing device 12, or may be connected to the computing device 12 as a separate device distinct from the computing device 12.

Although the representative embodiments of the present disclosure have been described in detail as above, those skilled in the art will understand that various modifications may be made thereto without departing from the scope of the present disclosure. Therefore, the scope of rights of the present disclosure should not be limited to the described embodiments, but should be defined not only by the claims set forth below but also by equivalents of the claims.

What is claimed is:

1. A speech video generation device that is a computing device having one or more processors and a memory which stores one or more programs executed by the one or more processors, the speech video generation device comprising:
   a first encoder configured to receive an input of an image that is a video part of a speech video of a person and extract an image feature vector from the image;
   a second encoder configured to receive an input of a speech audio signal of the speech video and extract a voice feature vector from the speech audio signal;
   a combining unit configured to generate a combined vector by combining the image feature vector extracted by the first encoder and the voice feature vector extracted by the second encoder;
   a first decoder configured to reconstruct the speech video of the person using the combined vector as an input; and
   a second decoder configured to predict a landmark of the speech video using the combined vector as an input,
   wherein a portion related to a speech of the person is hidden by a mask in the image,
   wherein the speech audio signal is an audio part of the same section as the image of the speech video of the person, wherein the first decoder is a machine learning model trained to reconstruct the portion hidden by the mask in the image based on the voice feature vector.

2. The speech video generation device of claim 1, wherein when the image of the person is input to the first encoder, and the speech audio signal not related to the image is input to the second encoder;
   the combining unit generates the combined vector by combining the image feature vector output from the first encoder and the voice feature vector output from the second encoder;
   the first decoder receives the combined vector to generate the speech video of the person by reconstructing, based on the speech audio signal not related to the image, the portion related to the speech in the image; and
   the second decoder predicts and outputs the landmark of the speech video.

3. The speech video generation device of claim 1, wherein the second decoder comprises:
   an extraction module trained to extract a feature vector from the input combined vector; and
   a prediction module trained to predict landmark coordinates of the speech video based on the feature vector extracted by the extraction module.

4. The speech video generation device of claim 3, wherein an objective function $L_{prediction}$ of the second decoder is expressed as an equation below:

$$L_{prediction} = \|K - G(I;\theta)\| \qquad \text{[Equation]}$$

where K: Labeled landmark coordinates of a speech video;
G: Neural network constituting the second decoder;
$\theta$: Parameter of the neural network constituting the second decoder;
I: Combined vector;
$G(I;\theta)$: Landmark coordinates predicted by the second decoder; and
$\|K - G(I;\theta)\|$: Function for deriving a difference between the labeled landmark coordinates and the predicted landmark coordinates of the speech video.

5. The speech video generation device of claim 1, wherein the second decoder comprises:
   an extraction module trained to extract a feature tensor from the input combined vector; and
   a prediction module trained to predict a landmark image based on the feature tensor extracted by the extraction module.

6. The speech video generation device of claim 5, wherein the landmark image is an image indicating, by a probability value, whether each pixel corresponds to a landmark in an image space corresponding to the speech video.

7. The speech video generation device of claim 5, wherein an objective function $L_{prediction}$ of the second decoder is expressed as an equation below:

$$L_{prediction} = -\Sigma\{p_{target}(x_i,y_i)\log(p(x_i,y_i)) + (1-p_{target}(x_i,y_i))\log(1-p(x_i,y_i))\} \qquad \text{[(Equation)]}$$

where $p(x_i, y_i)$: Probability value pertaining to whether a pixel $(x_i, y_i)$ is a landmark where $p(x_i, y_i)$=probability distribution $(P(F(x_i, y_i);\delta))$;
P: Neural network constituting the second decoder;
$F(x_i, y_i)$: Feature tensor of the pixel $(x_i, y_i)$;
$\delta$: Parameter of the neural network constituting the second decoder; and
$p_{target}(x_i, y_i)$: Labeled landmark indication value of the pixel $(x_i, y_i)$ of a speech video.

8. A speech video generation device that is a computing device having one or more processors and a memory which stores one or more programs executed by the one or more processors, the speech video generation device comprising:
 a first encoder, which receives an input of an image that is a video part in a speech video of a person, and extracts an image feature vector from the image;
 a second encoder, which receives an input of a speech audio signal that is an audio part in the speech video, and extracts a voice feature vector from the speech audio signal;
 a combining unit, which generates a combined vector by combining the image feature vector output from the first encoder and the voice feature vector output from the second encoder;
 a decoder, which uses the combined vector as an input, and performs deconvolution and up-sampling on the combined vector;
 a first output layer, which is connected to the decoder and outputs a reconstructed speech video of the person based on up-sampled data; and
 a second output layer, which is connected to the decoder and outputs a predicted landmark of the speech video based on the up-sampled data,
 wherein a portion related to a speech of the person is hidden by a mask in the image,
 wherein the speech audio signal is an audio part of the same section as the image of the speech video of the person, wherein the decoder is a machine learning model trained to reconstruct the portion hidden by the mask in the image based on the voice feature vector.

9. A speech video generation method performed by a computing device having one or more processors and a memory which stores one or more programs executed by the one or more processors, the speech video generation method comprising:
 receiving an input of an image that is a video part of a speech video of a person, and extracting an image feature vector from the image by a first encoder;
 receiving an input of a speech audio signal that is an audio part of the speech video, and extracting a voice feature vector from the speech audio signal by a second encoder;
 generating a combined vector by combining the image feature vector extracted by the first encoder and the voice feature vector extracted by the second encoder;
 reconstructing, by a first decoder, the speech video of the person by using the combined vector as an input; and
 predicting, by a second decoder, a landmark of the speech video by using the combined vector as an input,
 wherein a portion related to a speech of the person is hidden by a mask in the image,
 wherein the speech audio signal is an audio part of the same section as the image of the speech video of the person, wherein the first decoder is a machine learning model trained to reconstruct the portion hidden by the mask in the image based on the voice feature vector.

* * * * *